(12) United States Patent
Peng et al.

(10) Patent No.: US 6,206,518 B1
(45) Date of Patent: Mar. 27, 2001

(54) RESHAPABLE SUNGLASSES FRAME

(76) Inventors: Lily H. Peng, 22539 Ridge Line Rd., Diamond Bar, CA (US) 91765; Jerry C. Huang, 790 Granada Ave., San Marino, CA (US) 91108; Shinn-Guang Chung, 20080 Berkeley Way, Yorba Linda, CA (US) 92686

( * ) Notice: Subject to any disclaimer, the term of this patent is extended or adjusted under 35 U.S.C. 154(b) by 0 days.

(21) Appl. No.: 09/036,906

(22) Filed: Mar. 9, 1998

(51) Int. Cl.⁷ .................................................. G02C 9/00
(52) U.S. Cl. ................................................... 351/47
(58) Field of Search ................................ 351/44, 47, 48, 351/49, 57, 110, 121, 136, 139

(56) References Cited

U.S. PATENT DOCUMENTS 4,247,178 * 1/1981 Cook ....................................... 351/47
4,534,627 * 8/1985 Vosper ................................... 351/47
5,387,949 * 2/1995 Tackles .................................. 351/121

* cited by examiner

*Primary Examiner*—George Manuel

(57) ABSTRACT

A reshapable sunglasses frame having a bridge with two open elliptical lens frames made of soft reshapable metal that will retain the shape that it is bent to and has a gap in each lens frame for inserting the lens. Each gap is closed by a thin string that is pulled tightly around the lens and attached to the two ends of each lens frame. The reshapable sunglasses frame is easily reshapable by bending each of the lens frame to conform to the shape of the lens. Once the lens frames are bent to the new shape, it will retain its new shape until further reshaping.

3 Claims, 1 Drawing Sheet

RESHAPABLE SUNGLASSES FRAME

BACKGROUND

1. Field of Invention

This invention relates to a clip-on sunglasses frame consisting of thin wire frame. Clip-on sunglasses frame, are usually made of rigid plastic or metallic wire. The rigid plastic sunglasses frame are usually relatively thick and cannot be reshaped without destroying the plastic frame. The metallic wire sunglasses frame are usually relatively thin and resists reshaping due to its elastic characteristic, which will tend to spring back to its original shape.

The clip-on sunglasses is usually attached to the regular prescription glasses by means of a clip or tabs that hold on to the frame of the regular prescription glasses. This will allow the user to wear his/her regular prescription glasses indoor and simply clip-on the sunglasses when he/she is outdoor.

2. Description of Prior Art

Clip-on sunglasses, particularly of the clip-on type, are known to comprise of a rigid plastic or metallic frame in the shape of the regular prescription glasses with clips or tabs that is used to attach the frame to the regular prescription glasses.

If the clip-on sunglasses are made of rigid plastic, they are usually relatively thick and inflexible. It cannot be bent or reshaped without damaging the frame. If the clip-on sunglasses are made of metallic wires they are usually relatively thin and flexible. The metal frame is usually made of elastic metals that springs back to its original shape when deformed.

OBJECTS AND ADVANTAGES

My reshapable sunglasses frame is designed to be easy and inexpensive to manufacture. The reshapable sunglasses frame is also designed to be easily reshapable without much effort or skill. It is designed to accommodate a wide variety of different shapes of lenses without requiring a different frame for each shape of lenses.

DRAWING FIGURE

Figure 1:
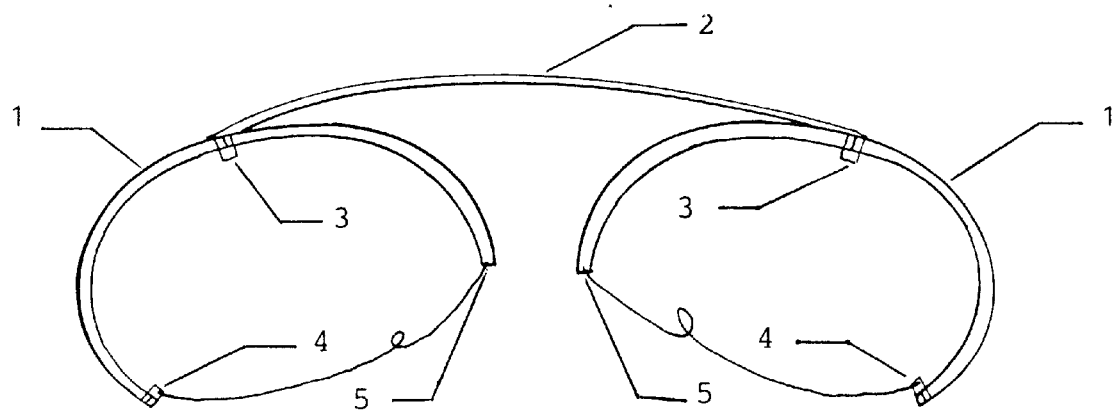
FIG. 1 shows the frontal view of the reshapable sunglasses frame.

REFERENCE NUMERALS IN DRAWINGS
Reference Numerals In Drawings

1. Lens frame
2. Bridge
3. Top L-shaped tabs
4. Bottom L-shaped tabs
5. Center end of the lens frames
6. Holes in center end of the lens frame
7. Holes in the bottom end of the lens frame with the L-shaped tab

Description—FIG. 1

A typical embodiment of the reshapable sunglasses frame of the present invention is illustrated in FIG. 1. The reshapable sunglasses frame has a bridge 2 with two ends to each of which is rigidly attached a lens frame 1. At the attachment point on each lens frame 1 is rigidly attached a top L-shaped tab 3 perpendicular to the plane of the lens frame 1. Each of the lens frame 1 is in an elliptical shape and has an opening with a center end 5 and a bottom end to which a L-shaped tab 4 is rigidly attached perpendicularly to the plane of the lens frame 1.

Figure 2:
FIG. 2 shows the top view of the reshapable sunglasses frame.

Description—FIG. 2

FIG. 2 shows the top view of the reshapable sunglasses frame. The reshapable sunglasses frame has a total of four L-shaped tabs 3, 4 perpendicularly and rigidly attached to it. The top L-shaped tabs 3 are rigidly attached to each of the lens frame 1 at the point where the bridge 2 meets each of the lens frame 1. The bottom L-shaped tabs 4 are rigidly attached to each of the lens frame 1 at the bottom end of the lens frame 1.

Figure 3:
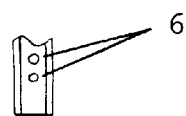
FIG. 3 shows the detail sectional view of the center end of the lens frame.

Description—FIG. 3

FIG. 3 shows the detail sectional view of the center end 5 of the lens frame 1. In the center end 5 of the lens frame 1 are two holes 6 through the lens frame 1 oriented parallel to the plane of the lens frame 1 for receiving one end of a thin string.

Figure 4:
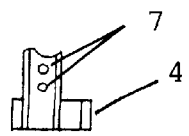
FIG. 4 shows the detail sectional view of the bottom end of the lens frame with the L-shaped tab.

Description—FIG. 4

FIG. 4 shows the detail sectional view of the bottom end of the lens frame 1 with the L-shaped tabs 4. Immediately adjacent to the L-shaped tab 4 are two holes 7 through the lens frame 1 oriented parallel to the plane of the lens frame 1 for receiving the other end of a thin string.

Operation—FIG. 1

The manner of using the reshapable sunglasses frame is by lightly bending the lens frames 1 to the shape of the lens and enclose the lenses in the lens frames 1 by a thin string attached to each end of the lens frame 1. The thin string is pulled tightly to firmly enclose the lenses to the lens frames 1. The lens frames 1 can be easily bent to conform to any shape of lenses without much effort and will retain the shape.

The reshapable sunglasses frame is easily attached to the regular prescription glasses by means of four L-shaped tabs 3, 4. Each of the four L-shaped tabs 3, 4 is placed around the frame of the regular prescription glasses thereby attaching the reshapable sunglasses frame to the regular prescription glasses.

SUMMARY, RAMIFICATIONS, AND SCOPE

Accordingly, it is clear that the reshapable sunglasses frame of this invention is very easy and inexpensive to manufacture. The reshapable sunglasses frame is extremely easy to use and adapts easily to different shapes of lenses without requiring a different frame for each shape.

Although the descriptions above contains many specifications, these should not be construed as limiting the scope of the invention but as merely providing illustrations of some of the presently preferred embodiments of this invention.

Thus the scope of the invention should be determined by the appended claims and their legal equivalents, rather than by the examples given.

I claim:

1. A reshapable sunglasses frame of the type comprising:
   a. a bridge with two ends;
   b. a lens frame rigidly attached to each end of the bridge wherein;
      i. said lens frame is in an elliptical shape with a gap in the elliptical shape that forms two ends of the lens frame;
      ii. said lens frame has two L-shaped tabs rigidly and perpendicularly attached to its circumference;
   c. a thin string flexibly attached to each end of the lens frame such that it will retain a lens within the lens frame.

2. The reshapable sunglasses frame according to claim 1, wherein the lens frame is made of brass.

3. The reshapable sunglasses frame according to claim 1, wherein each of the L-shaped tabs has a thin plastic cover around it.

* * * * *